Figure 1:
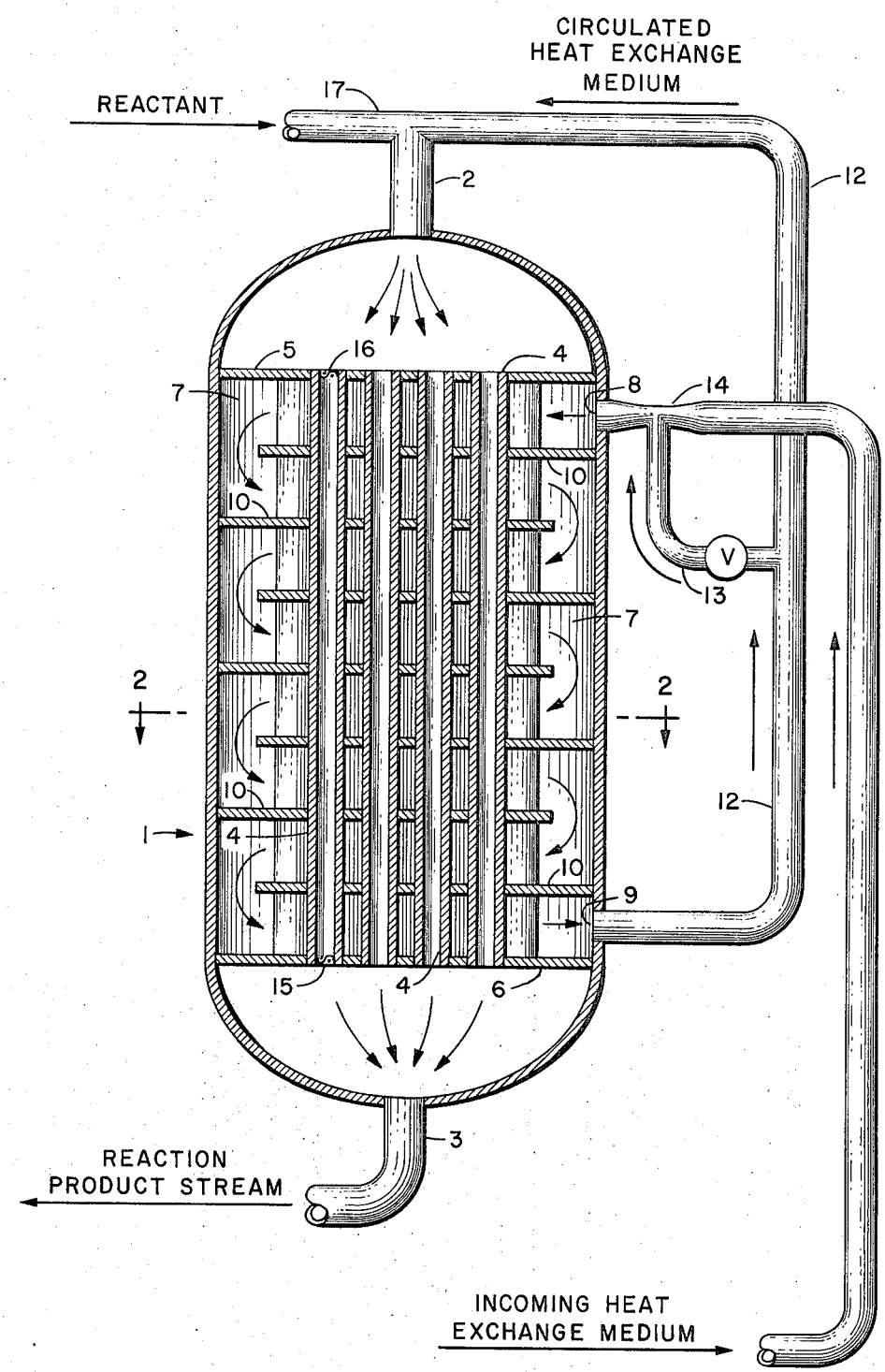

United States Patent
Smith

[11] 3,807,963
[45] Apr. 30, 1974

[54] REACTION APPARATUS
[76] Inventor: John H. Smith, Brigg-Lincolnshire, England
[22] Filed: Mar. 9, 1972
[21] Appl. No.: 233,055

[52] U.S. Cl. ............. 23/288 K, 23/284, 23/288 M, 165/108, 260/669 R, 260/700
[51] Int. Cl. ....... B01j 9/04, C07c 15/10, F28f 13/00
[58] Field of Search .......... 23/288 R, 288 K, 288 L, 23/288 M, 289, 285, 284, 288 F; 260/696, 700; 165/108

[56] References Cited
UNITED STATES PATENTS

| | | | |
|---|---|---|---|
| 688,472 | 12/1901 | Knietsch | 23/288 K |
| 1,900,857 | 3/1933 | Berry et al. | 23/288 M |
| 2,937,077 | 5/1960 | Faatz, Jr. et al. | 23/288 M X |
| 3,484,214 | 12/1969 | Gehring et al. | 23/288 R |
| 3,499,797 | 3/1970 | Hooper | 23/288 R X |
| 2,947,600 | 8/1960 | Clayton | 23/288 F X |
| 3,061,416 | 10/1962 | Kazokas | 23/288 F |

*Primary Examiner*—Joseph Scovronek
*Attorney, Agent, or Firm*—Ronald J. Carlson

[57] ABSTRACT

Endothermic and exothermic reactions utilizing inert diluents or thermally stable reactants or product components are conducted by employing the inert diluent, etc., initially as a heat exchange medium followed by combining at least a portion thereof with the principal reactant to form the reactant feed stream to the reaction zone. The concept is useful in situations wherein isothermal conditions are desired. Both method and apparatus are described for carrying out the concept with particular application to reactions involving the dehydrogenation of alkylated aromatic hydrocarbons.

6 Claims, 2 Drawing Figures

REACTION APPARATUS

This invention relates to an improved method and apparatus for conducting reactions utilizing inert diluents or thermally stable reactants or product components, and particularly for isothermally conducting such reactions. In one specific aspect, the invention relates to a method and apparatus for isothermally dehydrogenating alkylated hydrocarbons in the presence of steam to produce vinyl-substituted aromatic hydrocarbons.

Various techniques are known for conducting certain reactions wherein a reactant stream is employed to provide heat or cooling to the reaction stream; for example, see U.S. Pat. Nos. 3,254,967; 3,366,461; and 3,440,021. Disadvantageously, these techniques have involved the use of highly complex apparatus which are costly to construct and maintain. Moreover, insofar as reactions involving dehydrogenating alkylated hydrocarbons in the presence of steam are concerned, it appears from the art that there has been no attempt to utilize these techniques; see U.S. Pat. Nos. 2,831,907; 2,851,502 and 3,118,006.

In accordance with this invention, there is provided a simplified method and apparatus suitable for use in conducting both endothermic and exothermic reactions wherein an inert diluent or a thermally stable recycle reactant or product component is utilized to heat or cool the reaction stream. Briefly described, the method of this invention involves introducing a reactant feed stream to a reaction chamber, reacting the reactant in the reaction chamber and withdrawing a reaction product stream; simultaneously passing a heat exchange medium in indirect heat exchange relationship with the reactant stream during reaction, withdrawing the heat exchange medium from the heat exchange relationship and combining at least a portion of the heat exchange medium with an incoming reactant to form the reactant feed stream prior to being introduced to the reaction chamber. The apparatus embodiment comprises a reactor shell having a reactant stream inlet, a product stream outlet, at least one reaction chamber extending between the reactant stream inlet and the product stream outlet and communicating therewith, a heat exchange chamber surrounding said reaction chamber, a heat exchange medium inlet communicating with said heat exchange chamber in a region adjacent the reaction stream inlet and a heat exchange medium outlet communicating with said heat exchange chamber in a region adjacent the product stream outlet; means for introducing a heat exchange medium to the heat exchange medium inlet and flowing said heat exchange medium through said heat exchange chamber and out through said heat exchange medium outlet; means communicating with said heat exchange medium outlet and said reactant stream inlet for transmitting and introducing at least a portion of said heat exchange medium to said reactant stream inlet, and means for introducing the reactant stream to said reactant stream inlet.

In the above-described method and apparatus, the heat exchange medium, which is an inert diluent or thermally stable recycle reactant or product component, is first introduced through the reactor shell to the heat exchange chamber with or without a controlled amount of recycle. In passing through the heat exchange chamber, the heat exchange medium supplies or removes the heat of reaction by indirect heat exchange through the walls of the reaction chamber, depending on whether the reaction is endothermic or exothermic.

In conducting an endothermic reaction using this invention, the heat exchange medium is heated to an elevated temperature whereby it supplies heat to the reaction as it passes through the heat exchange chamber and is thereby cooled to the desired temperature for subsequent mixing with the reactant stream. In the case of an exothermic reaction, the heat exchange medium is initially cooled and thereby removes heat from the reaction as it passes through the heat exchange chamber. In absorbing heat from the reaction, the heat exchange medium becomes heated to or close to the desired temperature for subsequent mixing with the reactant stream. In some instances, it may be necessary to further heat the heat exchange medium to achieve the desired temperature. In either event, the heat exchange medium is then transmitted from the heat exchange chamber to the reactant stream inlet of the reactor shell whereat it becomes mixed with the incoming fresh reactant for passage through the reaction chamber. As indicated above, a portion of the heat exchange medium withdrawn from the heat exchange chamber may be diverted for recycle back to the heat exchange chamber for further temperature control.

Figure 2:
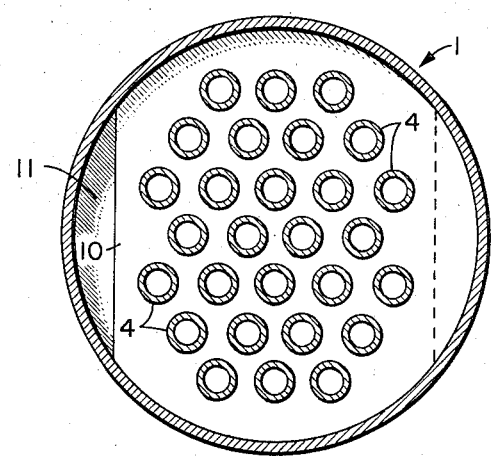

For a more complete understanding of the invention, reference is made to the accompanying drawings wherein;

FIG. 1 is a cross sectional view of an embodiment of the apparatus of this invention, and FIG. 2 is a sectional view of the reactor shell taken along line A—A of FIG. 1.

Referring particularly to FIG. 1, there is shown a reactor shell 1 in a vertically disposed relationship having a reactant stream inlet 2 at its upper end and a product stream outlet 3 at its lower end. The reaction chamber depicted in this embodiment comprises a plurality of reaction tubes 4 disposed in spaced apart relationship and extending between the inlet and the outlet from an upper supporting plate 5 to a lower supporting plate 6. The reactor tubes are secured at their ends to the supporting plates, and the supporting plates in turn are secured to the side walls of the reactor shell. The space thus defined between the supporting plates and surrounding the exteriors of the reactor tubes thereby serves as the heat exchange chamber 7. An inlet 8 to the heat exchange chamber is provided in the upper portion of the reactor shell and an outlet 9 from the heat exchange chamber is provided in the lower portion of the reactor shell whereby the heat exchange medium is circulated through the chamber.

A series of alternating, horizontal baffles 10 are preferably provided within the heat exchange chamber so as to form a series of lateral baffle zones which provide flow patterns across the reactor tubes for the heat exchange medium passing through the heat exchange chamber. The baffles extend horizontally outward from the reactor shell side walls, partially across the shell, in an alternating manner and more fully described hereinafter in connection with FIG. 2. Any number of baffles may be employed depending upon the desired operating conditions, e.g., pressure drop, temperature control, etc. For illustration purposes only, seven such baffles are shown in the apparatus of FIG. 1.

Referring to FIG. 2, the arrangement of the reactor tubes and a baffle are clearly depicted. Here again, the number of reactor tubes and their arrangement within the reactor shell may vary considerably depending upon the type of reaction and the conditions to be employed, all of which is within the engineering skill of the art. In particular, it should be noted that the baffle 10 extends only part way across the reactor shell forming a space 11 which in cross section has the shape of a segment of a circle and in which no reactor tubes are mounted. This space permits the unrestircted flow of the heat exchange medium from one baffle zone to another, progressively from the inlet 8 to the outlet 9. The size of these spaces will depend upon various operating considerations including the aceptable pressure drop throughout the heat exchange chamber.

Thus, it should be apparent that the flow pattern of the heat exchange medium involves successive flow across all the reactor tubes within each baffle zone progressing from the inlet 8 to the outlet 9 so that the general flow of the heat exchange medium is concurrent with the flow of the reaction mixture through the reactor tubes. In this way the temperature differential across the walls of the reactor tubes is greatest where the concentration of reactant is highest and therefore requiring the greatest heat transfer, whether the reaction is endothermic or exothermic.

In FIG. 1 again, there is shown communicating with the outlet 9 of the heat exchange chamber, a conduit 12 transmitting the heat exchange medium to the reactant stream inlet 2 at the upper portion of the reactor shell. While the heat exchange medium may be entirely transmitted to the reactant stream inlet, it is preferred to provide a bypass 13 for bypassing a portion of the heat exchange medium from conduit 12 back to the heat exchange chamber. In this embodiment of the invention, an eductor 14 or similar device is employed to introduce the heat exchange medium to the heat exchange chamber. By connecting the bypass to the eductor, the bypass heat exchange medium is drawn into the primary stream of heat exchange medium and both are introduced to the heat exchange chamber. The bypass may be controlled by a simple hand-operated valve arrangement or, alternatively, by an automatically operated hydraulic or pneumatic valving arrangement. When any of the heat exchange medium is diverted for recycle, it merely passes through the bypass and combines with the incoming stream of heat exchange medium being introduced in the upper portion of the heat exchange chamber.

In any event, at least a portion of the heat exchange medium is transmitted to the reactant stream inlet 2 of the reactor shell. At this inlet the heat exchange medium combines with incoming reactant from conduit 17, and the mixture passes into the upper portion of the reactor shell and then downwardly through the reactor tubes 4.

Depending upon the particular reaction being conducted, the reactor tubes may be charged with a catalyst. In this situation it is merely necessary to provide each tube with suitable catalyst retaining screens as indicated at 15 and 16 on one of the reactor tubes 4 in FIG. 1. These screens should be of such mesh size as to retain the catalyst, which is particulate in form, yet not excessively fine so as to cause an undue pressure drop across the reactor tube. At least one of the screens of each tube, and preferably both, should be removable so as to permit charging and discharging of the catalyst.

As indicated hereinbefore, the above-described invention is particularly suitable for conducting reactions involving the dehydrogenation of alkylated aromatic hydrocarbons, such as the dehydrogenation of ethylbenzene to form styrene. In a typical reaction of this latter type, ethylbenzene is dehydrogenated by mixing it with steam and then passing the mixture through a catalyst bed whereupon dehydrogenation to styrene takes place. Using the present invention for conducting this reaction, ethylbenzene is fed through conduit 17 to the reactant stream inlet 2 of the reactor shell. The ethylbenzene may be premixed with a quantity of steam and preheated to a desired temperature depending upon the overall heat balance of the system. At the reactant stream inlet of the reactor shell, the incoming ethylbenzene stream is combined with additional steam which has been transmitted through conduit 12 from the outlet 9 of the heat exchange chamber of the apparatus. The reactant mixture then enters the upper portion of the reactor shell. This mixture then passes downwardly through the reactor tubes which have previously been charged with a suitable dehydrogenation catalyst such as ferric oxide-potassium oxide, magnesium oxide-ferric oxide-potassium carbonate, alumina-silica-nickel, and similar well-known catalysts of this type such as those described in U.S. Pat. No. 2,110,833.

Since the reaction is endothermic, a sufficient quantity of superheated steam is used as the heat exchange medium and is introduced to the heat exchange chamber surrounding the reactor tubes serving to provide the necessary heat to drive the reaction towards completion while the mixture of ethylbenzene and steam passes through the catalyst-charged reactor tubes. During passage through the heat exchange chamber, the steam becomes cooled to a desired temperature for being combined with the incoming ethylbenzene stream at the reactant stream inlet of the reactor shell. In order to assure that the desired quantity of steam is combined with the ethylbenzene stream while at the same time insuring that the proper temperature conditions are maintained within the reactor shell, a quantity of the steam exiting from the heat exchange chamber may be bypassed through 13 for recycle back to the chamber with the incoming primary steam.

The reaction product mixture exiting from the reactor tubes in the lower portion of the reactor shell is then withdrawn through the product reactant stream outlet 3 in the lower portion and sent to the usual recovery operations. This product stream may be used to preheat the incoming ethylbenzene stream, if desired, using a standard heat exchanger.

An example of a suggested operating procedure using the invention to isothermally convert ethylbenzene to styrene is as follows: a stream of ethylbenzene is premixed with steam in a ratio of about 1 to 0.1 by weight respectively, and is preheated to about 950°F. through heat exchange (which may involve the reaction product stream after the process begins operating on a continuous basis). The thus formed mixture is then fed to the reactant inlet whereat it is commingled with additional steam so that the overall mixture has a ratio of about 2.5:1 by weight steam to ethylbenzene. This additional steam should have a temperature of somewhat greater than 1,180°F. whereby the overall mixture entering the reactor shell will be at a temperature of about 1,100°F. Assuming it is desired that 60 percent of the ethylbenzene undergo reaction and that the heat of reaction is 540 Btu/lb ethylbenzene, the material and heat balance require that further steam in a ratio of about 2.4:1 by weight steam to incoming ethylbenzene be introduced to the eductor 14 at a temperature of about 1,430°F. and recycle steam through bypass 13 be at a ratio of 2.5:1 by weight recycle steam to incoming ethylbenzene. Thus, the total heat exchange medium in the form of steam entering inlet 8 of the heat exchange chamber is at a ratio of about 4.9:1 by weight steam to incoming ethylbenzene which steam is at a temperature of somewhat over 1,300°F. as it initially comes into contact with the reactor tubes. With the reaction product stream being withdrawn from the reactor shell at a temperature of about 1,100°F., the steam being withdrawn from the heat exchange chamber will have cooled to about 1,180°F., the temperature at which it may be combined with the incoming ethylbenzene stream.

Thus having described the invention in detail, it will be understood by those skilled in the art that certain variations and modifications may be made without departing from the spirit and scope of the invention as described herein and in the appended claims.

I claim:

1. An apparatus for conducting endothermic or exothermic reactions comprising
   a. a reactor shell having a reactant stream inlet, a product stream outlet, at least one reaction chamber extending between the reactant stream inlet and the product stream outlet and communicating therewith, a heat exchange chamber surrounding said reaction chamber, a heat exchange medium inlet communicating with said heat exchange chamber in a region adjacent the reaction stream inlet and a heat exchange medium outlet communicating with said heat exchange chamber in a region adjacent the product stream outlet;
   b. means for introducing a heat exchange medium to the heat exchange medium inlet and flowing said heat exchange medium through said heat exchange chamber and out through said heat exchange medium outlet;
   c. means communicating with said heat exchange medium outlet and said reactant stream inlet for transmitting and introducing at least a portion of said heat exchange medium to said reactant stream inlet; and
   d. separate means for introducing a reactant stream to said reactant stream inlet, said means being independent of the means for introducing a heat exchange medium to the heat exchange medium inlet.

2. An apparatus according to claim 1 wherein the reaction chamber comprises a plurality of reaction tubes.

3. An apparatus according to claim 2 wherein the reaction tubes are provided with means for supporting a catalyst bed.

4. An apparatus according to claim 1 wherein baffle means are provided for directing the flow of the heat exchange medium in alternating passes across the reaction chamber progressing to the heat exchange medium outlet.

5. An apparatus according to claim 1 wherein eductor means are provided for introducing the heat exchange medium to the heat exchange medium inlet.

6. An apparatus for conducting endothermic or exothermic reactions comprising
   a. a reactor shell having a reactant stream inlet, a product stream outlet, at least one reaction chamber extending between the reactant stream inlet and the product stream outlet and communicating therewith, a heat exchange chamber surrounding said reaction chamber, a heat exchange medium inlet communicating with said heat exchange chamber in a region adjacent the reaction stream inlet and a heat exchange medium outlet communicating with said heat exchange chamber in a region adjacent the product stream outlet;
   b. eductor means for introducing a heat exchange medium to the heat exchange medium inlet and means for flowing said heat exchange medium through said heat exchange chamber and out through said heat exchange medium outlet;
   c. means communicating with said heat exchange medium outlet and said reactant stream inlet for transmitting and introducing at least a portion of said heat exchange medium to said reactant stream inlet, said means including a bypass connecting to said eductor means for diverting a portion of the heat exchange medium back to the heat exchange chamber; and
   d. separate means for introducing a reactant stream to said reactant stream inlet, said means being independent of said eductor means.

* * * * *